United States Patent
Mukherjee et al.

(10) Patent No.: US 11,539,317 B2
(45) Date of Patent: Dec. 27, 2022

(54) SYSTEM AND METHOD FOR DETECTING DEGRADATION IN WIND TURBINE GENERATOR BEARINGS

(71) Applicant: General Electric Renovables Espana, S.L., Barcelona (ES)

(72) Inventors: Rupam Mukherjee, Bangalore (IN); Arvind Kumar Tiwari, Niskayuna, NY (US); Shahid Ali, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/222,008

(22) Filed: Apr. 5, 2021

(65) Prior Publication Data
US 2022/0321040 A1    Oct. 6, 2022

(51) Int. Cl.
*H02P 9/00*    (2006.01)

(52) U.S. Cl.
CPC ................. *H02P 9/007* (2013.01)

(58) Field of Classification Search
CPC . H02P 9/006; H02P 9/007; H02P 9/02; H02K 7/183
See application file for complete search history.

(56) References Cited

U.S. PATENT DOCUMENTS

| | | |
|---|---|---|
| 7,635,596 B2 | 12/2009 | Banavali et al. |
| 8,734,105 B2 | 5/2014 | Wadehn |
| 9,007,073 B2 | 4/2015 | Katafuchi |
| 10,519,935 B2 | 12/2019 | Sakaguchi et al. |
| 2011/0041611 A1* | 2/2011 | Hofer .................. F16C 19/527 73/579 |
| 2012/0179388 A1 | 7/2012 | Kuczynski et al. |
| 2013/0049733 A1* | 2/2013 | Neti .................... F03D 7/0264 324/71.1 |

(Continued)

FOREIGN PATENT DOCUMENTS

| | | |
|---|---|---|
| CN | 2520415 Y | 11/2002 |
| CN | 202033191 U | 11/2011 |

(Continued)

OTHER PUBLICATIONS

European Search Report for EP application No. 22165510.3, dated Aug. 3, 2022.

*Primary Examiner* — Julio C. Gonzalez
(74) *Attorney, Agent, or Firm* — Dority & Manning, P.A.

(57) ABSTRACT

A method for preventing damage in a bearing of a generator includes monitoring, via a controller, one or more electrical signals of the power conversion assembly. The method also includes converting the electricals signal(s) to a frequency domain. Further, the method includes extracting one or more spectral components in frequency bands of the frequency domain around one or more known characteristic frequencies of the bearing. Moreover, the method includes determining at least one characteristic of the spectral component(s) in the frequency bands. In addition, the method includes comparing the characteristic(s) of the spectral component(s) in the frequency bands to at least one baseline value. The method further includes generating a fault signal or a baseline signal for the bearing based on the comparison. In response to the fault signal being generated, the method includes implementing a control action.

14 Claims, 11 Drawing Sheets

(56) References Cited

U.S. PATENT DOCUMENTS

| | | | |
|---|---|---|---|
| 2014/0070789 A1 | 3/2014 | Nieuwenhuizen | |
| 2017/0260968 A1 | 9/2017 | Tsutsui et al. | |
| 2017/0328349 A1 | 11/2017 | Pan et al. | |
| 2019/0156600 A1 | 5/2019 | Potyrailo et al. | |
| 2019/0219032 A1 | 7/2019 | He et al. | |
| 2020/0292450 A1 | 9/2020 | Kojima et al. | |
| 2021/0108988 A1* | 4/2021 | Qiao | G01M 13/045 |

FOREIGN PATENT DOCUMENTS

| | | | | |
|---|---|---|---|---|
| CN | 102713554 A | 10/2012 | | |
| CN | 103389288 A | 11/2013 | | |
| CN | 103982556 A | 8/2014 | | |
| CN | 203856904 U | 10/2014 | | |
| CN | 204177367 U | 2/2015 | | |
| CN | 104459388 A * | 3/2015 | | |
| CN | 204204181 U | 3/2015 | | |
| CN | 106198020 A | 12/2016 | | |
| CN | 106338397 A | 1/2017 | | |
| CN | 206056648 U | 3/2017 | | |
| CN | 106679977 A | 5/2017 | | |
| CN | 106716103 A | 5/2017 | | |
| CN | 206399365 U | 8/2017 | | |
| CN | 107448362 A | 12/2017 | | |
| CN | 206818646 U | 12/2017 | | |
| CN | 108344574 A | 7/2018 | | |
| CN | 207701297 U | 8/2018 | | |
| CN | 108844742 A * | 11/2018 | | G01M 13/045 |
| CN | 108894932 A | 11/2018 | | |
| CN | 108932580 A | 12/2018 | | |
| CN | 109033719 A | 12/2018 | | |
| CN | 109387546 A | 2/2019 | | |
| CN | 109655266 A | 4/2019 | | |
| CN | 209212469 U | 8/2019 | | |
| CN | 110554090 A | 12/2019 | | |
| EP | 2522977 A1 | 11/2012 | | |
| EP | 2708741 A1 | 3/2014 | | |
| EP | 2927662 A1 | 10/2015 | | |
| EP | 3196627 A1 | 7/2017 | | |
| EP | 3343030 A1 | 7/2018 | | |
| JP | S61248999 A | 11/1986 | | |
| JP | S62223406 A | 10/1987 | | |
| JP | H0634541 A | 2/1994 | | |
| JP | 2008275494 A | 11/2008 | | |
| JP | 2015064215 A | 4/2015 | | |
| JP | 2019078718 A | 5/2019 | | |
| KR | 20160034634 A | 3/2016 | | |
| NL | 7503934 A | 7/1975 | | |
| WO | WO2011/081085 | 7/2011 | | |
| WO | WO2016/042983 A1 | 3/2016 | | |
| WO | WO2016/072290 A1 | 5/2016 | | |
| WO | WO2019/120871 A1 | 6/2019 | | |

\* cited by examiner

SYSTEM AND METHOD FOR DETECTING DEGRADATION IN WIND TURBINE GENERATOR BEARINGS

FIELD

The present disclosure relates generally to wind turbines and, more particularly, to a system and method for detecting degradation in a bearing (such as electrical discharge machining or lubricant degradation) of a generator using electrical signature analysis.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

In many wind turbines, the generator may be electrically coupled to a bi-directional power converter that includes a rotor-side converter joined to a line-side converter via a regulated DC link. Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the grid.

During operation, wind impacts the rotor blades and the blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. As such, a rotating magnetic field may be induced by the generator rotor and a voltage may be induced within a generator stator. Rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

Capacitive coupling between the rotor and the stator, though not the main contributor to the generated power, can induce an undesirable rotor shaft voltage in the rotor. Under normal operating conditions, the current driven by the rotor shaft voltage is safely dissipated through a ground brush that is in contact with the rotor and ground. Also, an insulation is provided between the bearing housing and the frame. However, high common-mode voltage injected through the rotor-side inverter can potentially damage the bearing through Electric Discharge Machining (EDM) if the grounding path through the ground brush is degraded and the bearing insulation fails. EDM causes pitting damage that results in grooves appearing in the raceways of the bearing(s) and out-of-roundness in the rolling elements. If left unchecked, these damages can progress beyond acceptable levels, which can potentially cause failure and unplanned shutdown.

In addition, for many wind turbine, the lubricant in the generator bearings degrades differently in different regions owing to the different weather patterns and usage. Re-lubrication is completed on a predetermined schedule, therefore, at times, the lubricant may be discarded when it is still usable.

Thus, the present disclosure is directed to a system and method for detecting degradation and/or damage in the incipient stage by analyzing the rotor-side or line-side three-phase voltages and currents so as to address the aforementioned issues.

BRIEF DESCRIPTION

Aspects and advantages of the present disclosure will be set forth in part in the following description, or may be obvious from the description, or may be learned through practice of the present disclosure.

In one aspect, the present invention is directed to a method for preventing damage in a bearing of a generator. The generator is electrically coupled to a power conversion assembly having a first converter coupled to a second converter. The method includes monitoring, via a controller, one or more electrical signals of the power conversion assembly. The method also includes converting, via the controller, the electricals signal(s) to a frequency domain. Further, the method includes extracting, via the controller, one or more spectral components in frequency bands of the frequency domain around one or more known characteristic frequencies of the bearing. Moreover, the method includes determining, via the controller, at least one characteristic of the spectral component(s) in the frequency bands. In addition, the method includes comparing, via the controller, the characteristic(s) of the spectral component(s) in the frequency bands to at least one baseline value. The method further includes generating, via the controller, a fault signal or a baseline signal for the bearing based on the comparison. In response to the fault signal being generated, the method includes implementing, via the controller, a control action.

In an embodiment, the electrical signal(s) may include current and/or voltage collected from the first converter. More specifically, in an embodiment, the generator may be part of a wind turbine power system. In such embodiments, the first converter may be a rotor-side converter and the second converter may be a line-side converter of the wind turbine power system. Further, in such embodiments, the current may be a three-phase rotor current and the voltage may be a three-phase rotor voltage of the rotor-side converter or the line-side converter.

In another embodiment, converting the electricals signal(s) to the frequency domain may include calculating a complex rotating vector of the one or more electrical signals and calculating a complex fast Fourier transform (FFT) of the complex rotating vector.

In further embodiments, determining the characteristic(s) of the spectral component(s) in the frequency bands may include calculating one or more peak magnitudes of the spectral component(s) in the frequency bands and calculating one or more entropies of the spectral component(s) in the frequency bands.

In additional embodiments, comparing the characteristic(s) of the spectral component(s) in the frequency bands to the threshold(s) may include comparing the one or more entropies to an entropy threshold and comparing the one or more peak magnitudes to a magnitude threshold.

In an embodiment, generating the fault signal or the baseline signal based on the comparison may include generating the fault signal when the one or more entropies exceeds the entropy threshold, if the one or more entropies is less than the entropy threshold, comparing the one or more peak magnitudes to the magnitude threshold, generating the fault signal when the one or more peak magnitudes is less than the magnitude threshold, and generating the baseline signal when the one or more entropies is less than the entropy threshold and the one or more peak magnitudes is greater than the magnitude threshold.

In such embodiments, increases in the one or more entropies and decreases in the one or more peak magnitudes indicates worsening of electrical discharge machining (EDM) damage in the bearing.

In particular embodiments, determining the characteristic(s) of the spectral component(s) in the frequency bands may include calculating a location of one or more peak magnitudes of the one or more spectral components in the frequency bands and monitoring changes in friction using the one or more spectral components in the frequency bands, wherein degrading lubrication causes gradual increases in the friction and changes in the location of the one or more peak magnitudes.

In additional embodiments, comparing the characteristic(s) of the spectral component(s) in the frequency bands to the baseline value(s) may include generating a high-dimensional vector comprising a plurality of characteristics, the plurality of characteristics comprising that least one characteristic and comparing the high-dimensional vector to a baseline cluster comprising similar vectors from a baseline generator.

In further embodiments, the control action may include changing an operating set point of the generator or the power conversion assembly, shutting down the generator, generating an alarm, scheduling a repair, replacing at least one component of the generator, or any other suitable action.

In another aspect, the present disclosure is directed to a method for preventing damage in a bearing of a generator of an electrical power system. The electrical power system has a power conversion assembly with a first converter coupled to a second converter. The power conversion assembly is electrically coupled to the generator. The method includes monitoring, via a controller, one or more electrical signals of the power conversion assembly of the electrical power system. Further, the method includes calculating, via the controller, a complex rotating vector of the one or more electrical signals. Moreover, the method includes calculating, via the controller, a complex fast Fourier transform (FFT) of the complex rotating vector. The method also includes extracting, via the controller, one or more spectral components in frequency bands around one or more known characteristic frequencies of the bearing. The method further includes calculating, via the controller, one or more peak magnitudes in the frequency bands. In addition, the method includes calculating, via the controller, one or more entropies in the frequency bands. Further, the method includes comparing, via the controller, the one or more entropies to an entropy threshold. Moreover, the method includes generating, via the controller, a fault signal for the bearing when the one or more entropies exceeds the entropy threshold. If the one or more entropies does not exceed the threshold, the method also includes comparing, via the controller, the one or more peak magnitudes to a magnitude threshold. The method further includes generating, via the controller, the fault signal for the bearing when the one or more peak magnitudes is less than the magnitude threshold. In addition, the method includes generating, via the controller, a baseline signal for the bearing when the one or more entropies is less than the entropy threshold and the one or more peak magnitudes is greater than the magnitude threshold. In response to the fault signal being generated, the method includes implementing, via the controller, a control action. It should be understood that the method may further include any one or more of the features and/or steps described herein.

In yet another aspect, the present disclosure is directed to a wind turbine power system connected to a power grid. The wind turbine power system includes a generator having a rotor, a stator, and at least one bearing. The wind turbine power system also includes a power conversion assembly electrically coupled to the generator. The power conversion assembly includes a rotor-side converter coupled to a line-side converter. Further, the wind turbine power system includes a controller configured to perform a plurality of operations, including but not limited to monitoring one or more electrical signals of the power conversion assembly, converting the one or more electricals signals to a frequency domain, extracting one or more spectral components in frequency bands of the frequency domain around one or more known characteristic frequencies of the bearing, determining at least one characteristic of the one or more spectral components in the frequency bands, comparing the at least one characteristic of the one or more spectral components in the frequency bands to at least one baseline value, generating a fault signal or a baseline signal for the bearing based on the comparison, and in response to the fault signal being generated, implementing a control action. It should be understood that the wind turbine power system may further include any one or more of the features described herein.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
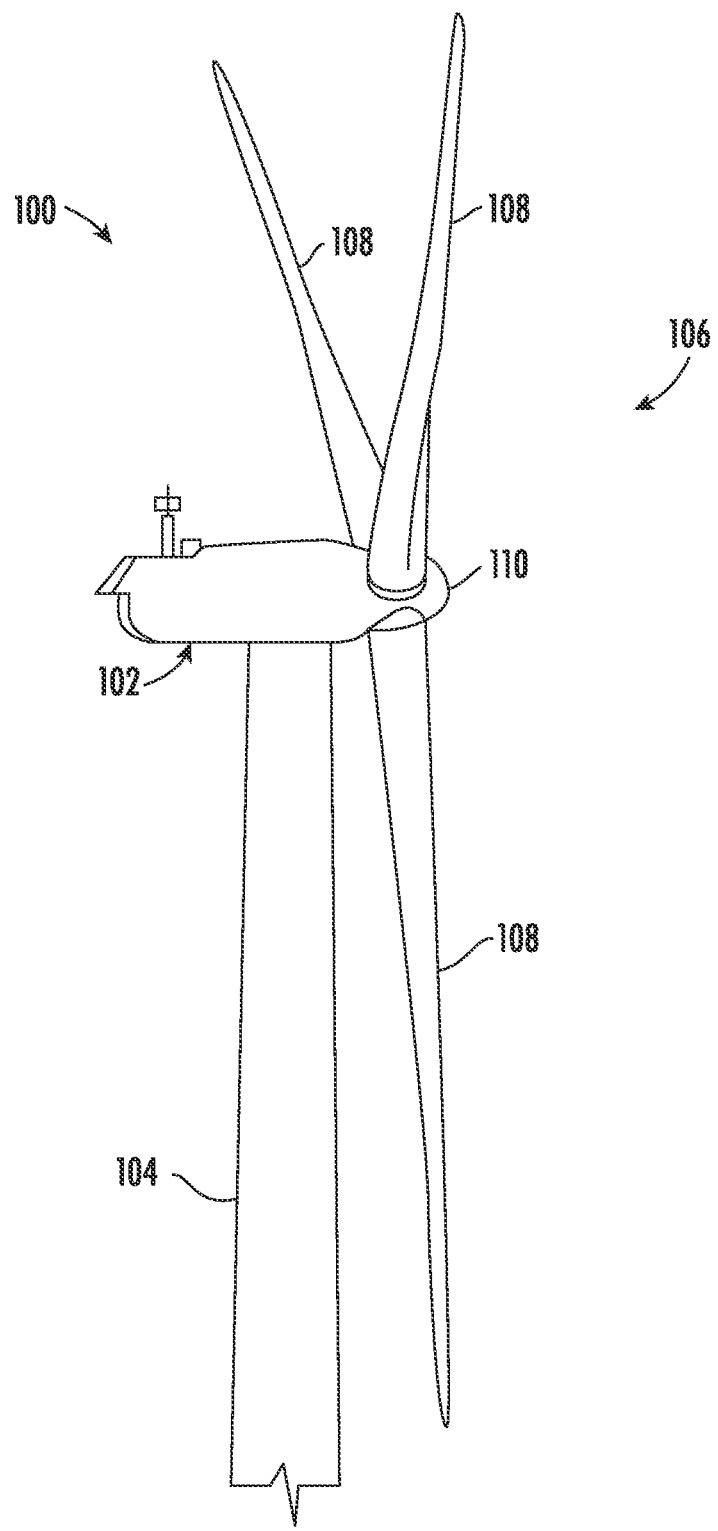
FIG. 1 illustrates a perspective view of a portion of one embodiment of a wind turbine according to the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present invention is directed to a system and method for preventing damage in a bearing of a generator (such as a DFIG, a permanent magnet generator (PMG), or any other electrical machine) of an electrical power system (such as a wind turbine power system) due to EDM and/or lubricant degradation. In particular, in an embodiment, three-phase currents and voltages injected by the rotor-side (or line-side) inverter may be analyzed to calculate FFT components around one or more known bearing characteristic frequencies. For EDM damage, the entropies and peaks of these frequency bands can be calculated and cluster changes in the high-dimensional space can be evaluated. Statistical deviation from the baseline cluster, such as gradual increases of entropy and decreases of the peak magnitude indicates worsening of the EDM damage. When lubricant degradation is present, gradual increases in friction and changes in the location of the frequency peaks can be observed in the three-phase currents and voltages. Thus, tracking the location of these peaks and/or the general deviation from a baseline in a multi-variate cluster analysis scenario provides the health metric for the bearing and a means to trend such data for estimating the remaining useful life (RUL) of the bearing. As used herein, the baseline cluster may include a collection of features corresponding to several data files captured from the generator under test, e.g., either around any particular time-period or spread over a certain extended period as necessary. Further, in an embodiment, the baseline cluster may involve features computed from different machines of similar rating/design installed at different places.

As such, the present disclosure provides many advantages not present in the prior art. For example, systems and methods of the present disclosure can achieve bearing diagnostics without the need for any separate sensor for measuring vibration or temperature. Rather, as mentioned, systems and methods of the present disclosure use inverter electrical signals for bearing diagnostics. Moreover, in an embodiment, systems and methods of the present disclosure detect EDM damage and/or lubricant degradation in an incipient stage before such damage begins to show in sensor data. As an example, systems and methods of the present disclosure can estimate ground-brush health through spectrum analysis of the current and can use entropy increases to detect damage. In addition, systems and methods of the present disclosure can use frequencies in addition to known characteristic bearing frequencies to complete high-fidelity bearing failure detection. Thus, intelligent scheduling of maintenance and/or repair activities can be employed.

Referring now to the drawings, FIG. 1 illustrates a perspective view of one embodiment of a portion of a wind turbine 100 according to the present disclosure that is configured to implement the method as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
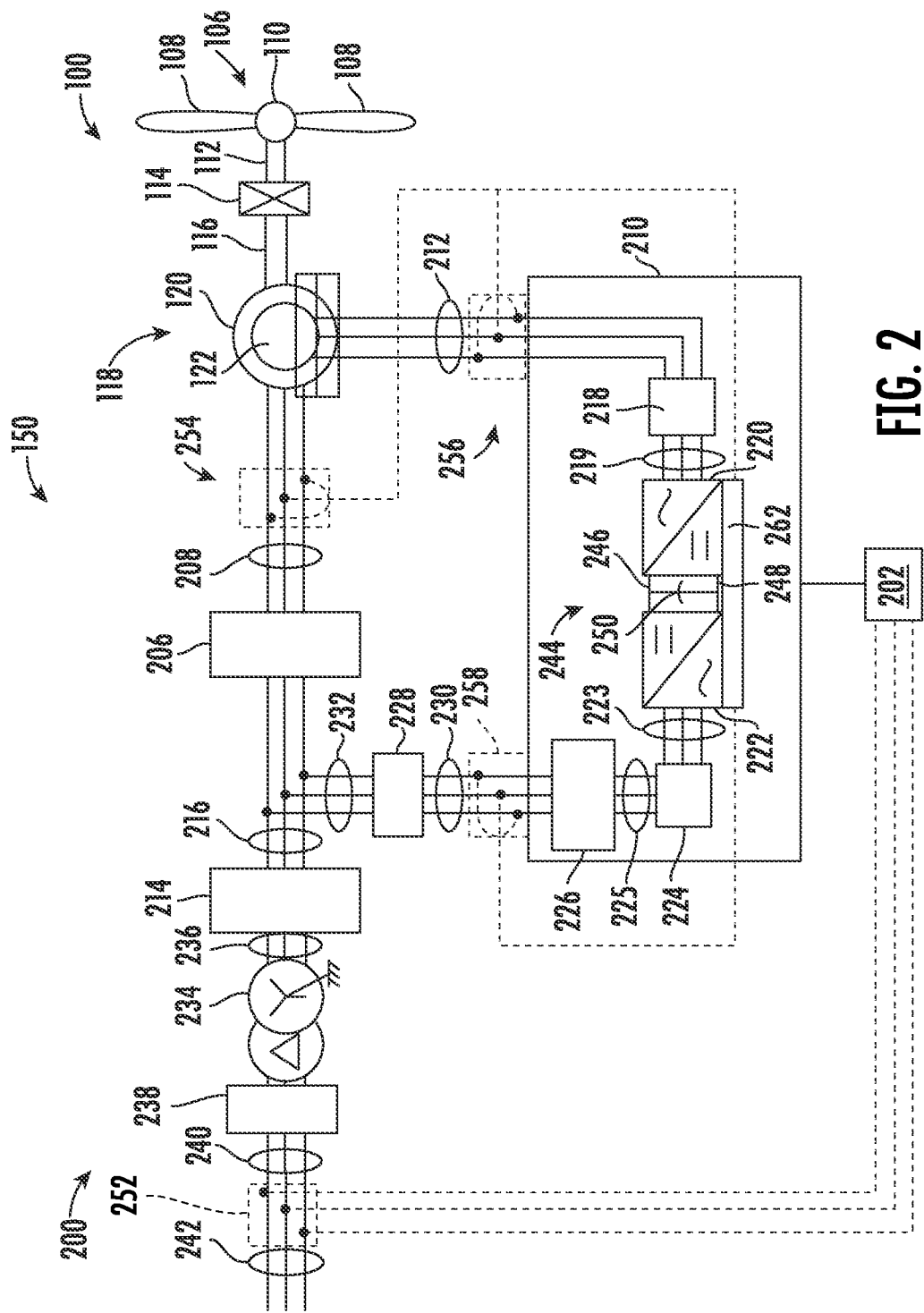
FIG. 2 illustrates a schematic view of one embodiment of an electrical power system suitable for use with the wind turbine shown in FIG. 1.
Figure 5:
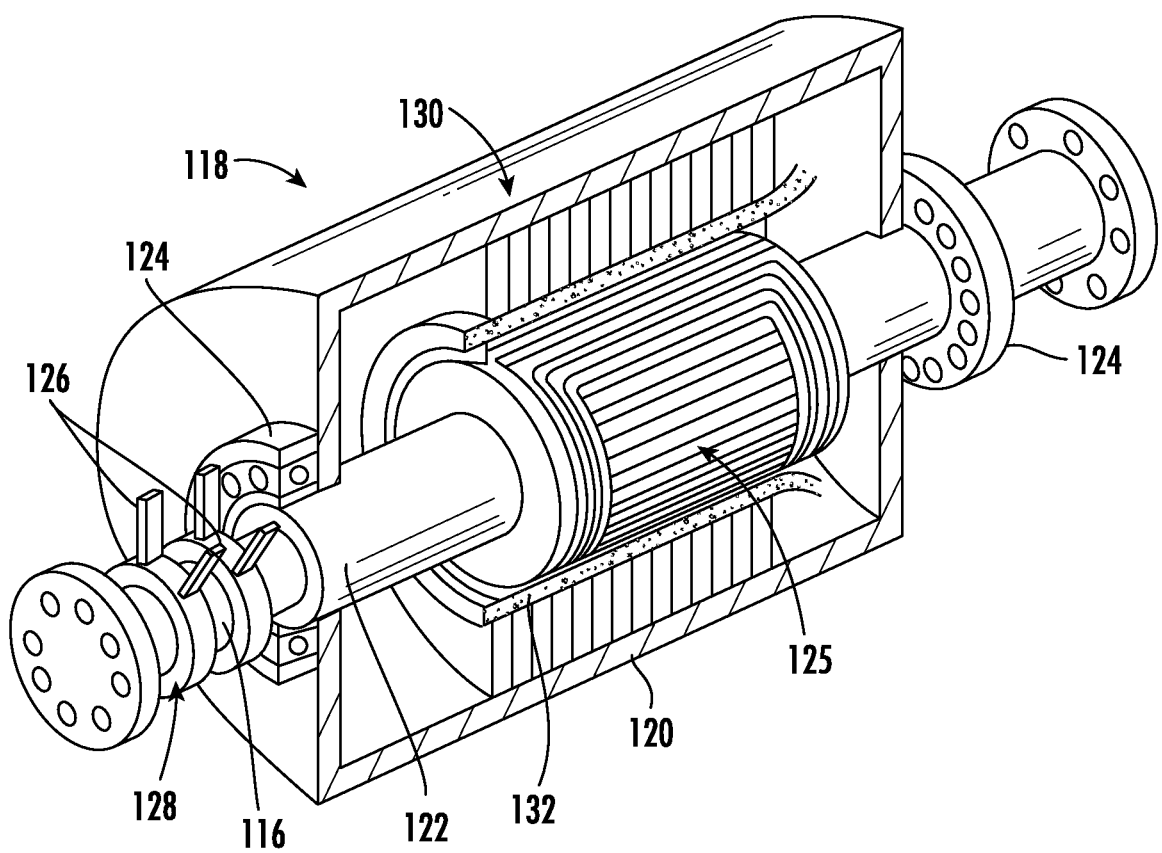
FIG. 5 illustrates a cross-sectional schematic view of one embodiment of a generator according to the present disclosure, particularly illustrating a ground brush contacting the rotor of the generator.

Referring now to FIG. 2, a schematic view of one embodiment of an electrical power system 200 that may be used with the wind turbine 100 is illustrated. Furthermore, the wind turbine 10 and the electrical power system 200 may be referred to herein collectively as a wind turbine power system 150. Thus, during operation of the wind turbine power system 150, wind impacts the blades 108 and the blades 108 transform wind energy into a mechanical rotational torque that rotatably drives a low-speed shaft 112 (also referred to herein as a rotor shaft) via the hub 110. The low-speed shaft 112 is configured to drive a gearbox 114 that subsequently steps up the low rotational speed of the low-speed shaft 112 to drive a high-speed shaft 116 (also referred to herein as a generator shaft) at an increased rotational speed. The high-speed shaft 116 is generally rotatably coupled to a generator 118 so as to rotatably drive a generator rotor 122 having field winding 125 (FIG. 5).

In one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

Figure 3:
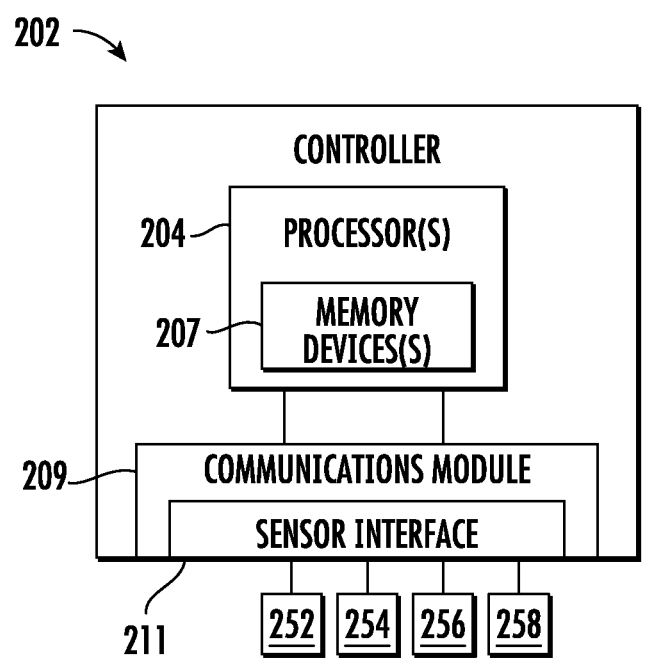
FIG. 3 illustrates a block diagram of one embodiment of a controller suitable for use with the wind turbine shown in FIG. 1.

In addition, the electrical power system 200 may include a controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212. Alternatively, the generator rotor 122 may be electrically coupled to the rotor bus 212 via any other device that facilitates operation of electrical power system 200 as described herein. In a further embodiment, the stator synchronizing switch 206 may be electrically coupled to a main transformer circuit breaker 214 via a system bus 216.

The power conversion assembly 210 may include a first converter and a second converter. For example, as shown, the first converter may be a rotor-side converter 220 and the second converter 22 may be a line-side converter 222. Further, as shown, the power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to the rotor-side power converter 220. Further, the rotor-side power converter 220 may be electrically coupled to the line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Figure 4:
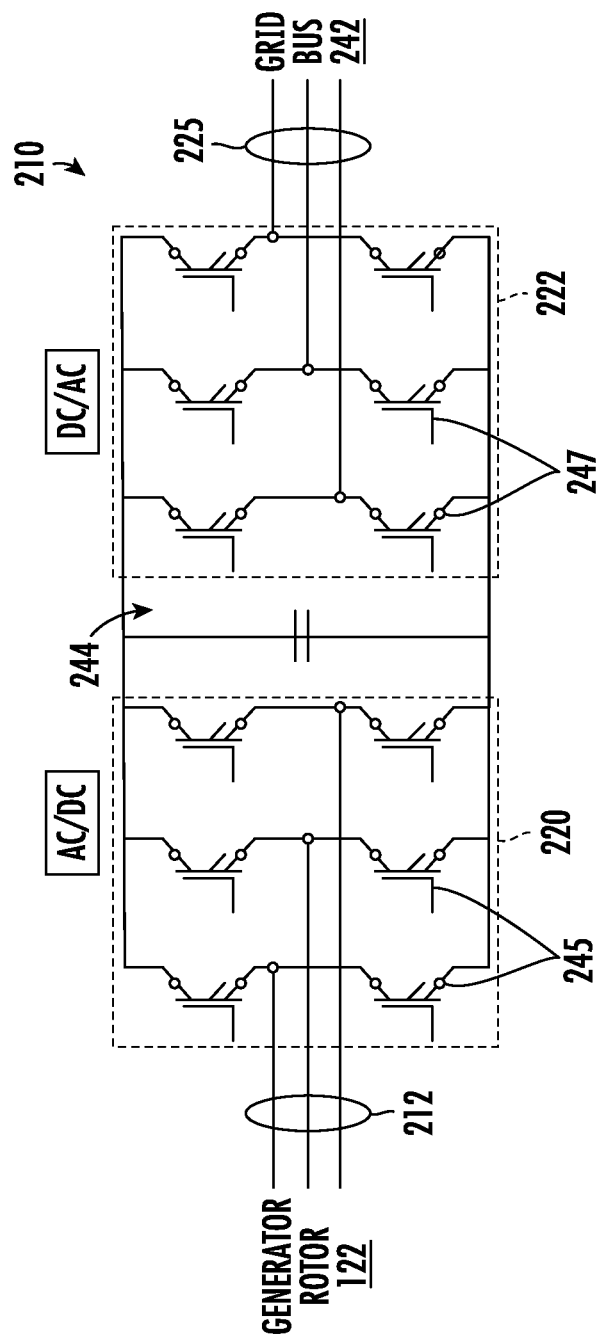
FIG. 4 illustrates a simplified schematic diagram of one embodiment of a variable frequency drive (VFD) that maintains a constant electrical frequency output on the grid side of the generator according to the present disclosure.

Referring particularly to FIGS. 2 and 4, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements 245 (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements 247 (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz).

It should be understood that the rotor-side power converter 220 and the line-side power converter 222 may have any configuration using any switching devices that facilitate operation of electrical power system 200 as described herein. For example, FIG. 4 illustrates a simplified schematic diagram of one embodiment of a variable frequency drive (VFD) that maintains a constant electrical frequency output on the grid side of the generator 118. As shown, the VFD configuration includes a six-switch voltage-sourced rectifier on the rotor side converter 220, a DC link capacitor 244 to minimize DC voltage variation, and a six-switch voltage-sourced inverter utilizing pulse width modulation on the grid side. Rotor-side switching elements 245 are often diodes or silicon controlled rectifiers (SCR), while the grid side-switching elements 247 are often insulated gate bipolar transistors (IGBTs). As such, the magnitude and electrical frequency of the current supplied to the generator rotor 122 through the VFD may be varied to account for changes in the rotor shaft speed and to maintain a constant output on the generator stator winding.

Further, the power conversion assembly 210 may be coupled in electronic data communication with the controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical power system 200 that facilitates operation of electrical power system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors 252, 254, 256, 258 may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is configured to receive one or more voltage and/or electric current feedback signals from the sensors 252, 254, 256, 258. More specifically, in certain embodiments, the current or voltage feedback signals may include at least one of line feedback signals, line-side converter feedback signals, rotor-side converter feedback signals, or stator feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. As such, the converter controller 262 is configured to implement the various method steps as described herein and may be configured similar to the controller 202.

Figure 6:
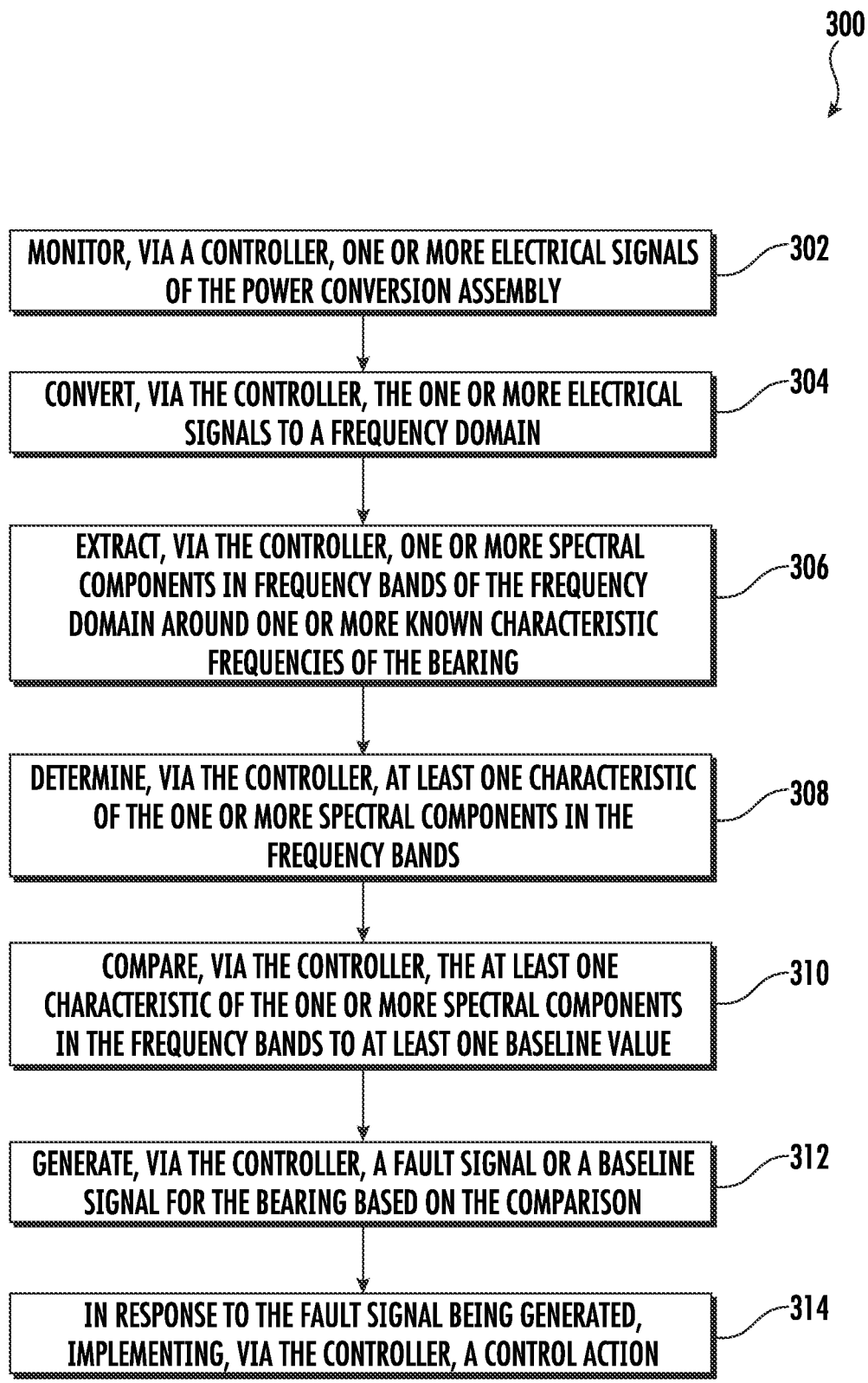
FIG. 6 illustrates a flow diagram of one embodiment of a method for preventing damage in a bearing of a generator due to EDM according to the present disclosure.

Referring now to FIGS. 5 and 6, various illustrations are provided to further describe the systems and methods of the present disclosure. For example, FIG. 5 illustrates a perspective cross-sectional view of one embodiment of the generator 118 of the present disclosure, particularly illustrating a plurality of brushes 126 configured with the rotor 122 thereof; and FIG. 6 illustrates a flow diagram of one embodiment of a method 300 for preventing damage in a bearing, such as bearings 124, of the generator 118 of an electrical power system 200.

As shown particularly in FIG. 5, the generator 118 may generally include a bearing housing 130 for housing the generator stator 120 and the generator rotor 122. Further, as shown, the generator rotor 122 includes the field winding 125 or coil. Moreover, as shown, the bearing housing 130 also generally includes bearing insulation 132 circumferentially arranged around the field winding 125. In addition, the generator 118 may further include one or more bearings 124 rotatably mounted into the high-speed shaft 116. Furthermore, the generator 118 may include one or more generator slip rings 128 with one or more brushes 126 secured thereto.

Accordingly, during wind turbine operation, voltage is typically induced on the high-speed shaft 116 due to capacitive coupling between the generator rotor 122 and the stator 120. The capacitive coupling is directly related to the VFD operation because a change in voltage over time (dv/dt) results in capacitive coupling. In addition, non-symmetry of the generator magnetic field may also cause shaft voltage on the high-speed shaft 116. Under normal operating conditions, the current driven by this induced shaft voltage is safely dissipated through the brushes 126. In general, such brushes 126 act as sliding contacts between the rotating slip ring and the stationary bus bars.

Further, such brushes 126 are typically constructed from a graphite/metal composite that is pressed into rectangular bar shapes and are typically mounted on the non-drive end of the generator 118. It should be understood that the generator 118 may include any suitable number of brushes 126, including particularly at least one brush. Moreover, as shown in FIG. 5, the brushes 126 may be mounted perpendicular to the high-speed shaft 116. Alternatively, the brushes 126 may have any other suitable mounting configuration with respect to the generator rotor 122. As such, some of the brushes 126 may be used to pull AC voltage off of at least one of the generator slip rings 128, while the remaining brush(es) act as a controlled path to ground (i.e. a ground brush). Further, as shown, the brushes 126 may be positioned radially outward of the generator slip ring(s) 128, with consecutive brushes in each set mounted 60 to 120 degrees apart. In addition, each brush 126 may be rigidly fixed in its axial position so as to minimize deflection under normal operational load. The brush holders may also use a constant pressure coil spring to maintain contact between the brush(es) 126 and the generator slip ring(s) 128. A micro switch may also be mounted at the base of the brush holder so as to trigger a warning signal if the brush has worn down too much.

As such, the ground brush 126 may be sized and oriented to engage the generator rotor 122 to facilitate providing an electrical connection from the generator rotor 122 to ground (not shown). Thus, the ground brush 126 is configured to protect the generator bearings 124 as well as all other components of the generator 118 from harmful electrical voltages and currents. More specifically, the ground brush 126 is configured to provide a low-impedance path around the bearings 124.

When the generator grounding system is compromised (i.e. the ground brush 126 loses contact with the corresponding generator slip ring 128 and/or the bearing insulation 132 becomes damaged), an excess voltage builds up on the high-speed shaft 116. This shaft voltage drives a current to find the lowest impedance path to ground. In the case of a DFIG, this path is through the bearing housing 130. More specifically, the high-speed shaft 116 will accumulate voltage first. If the grounding system is compromised (i.e. the ground brush 126 is lifted), all components connected or coupled to the generator rotor 122 will also begin to accumulate voltage. The outer race ball pass is where the majority of the discharge occurs due to the presence of lubricating oil. The oil has a low dielectric capacity and breaks down quicker than the surrounding air or other dielectric materials. Once this voltage exceeds the dielectric capacity of the lubricating oil in the bearing, it will discharge in a pulse, causing an arc. This cycle will repeat as long as the ground brush 126 is lifted, causing pitting and fluting of the bearing track, ultimately leading to bearing failure. In addition, the aforementioned issues also cause damage to the bearing insulation 132.

As such, the present disclosure is directed to preventing such bearing damage, such as EDM damage. More specifically, as shown in FIG. 6, a flow diagram of one embodiment of the method 300 for preventing damage in a bearing, such as bearings 124, of the generator 118 due to EDM is shown. In general, the method 300 is described herein with reference to the wind turbine 10, the electrical power system 200, the controller 202, and the generator 118 illustrated in FIGS. 1-5. However, it should be appreciated that the disclosed method 300 may be implemented with electrical power systems having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 7:
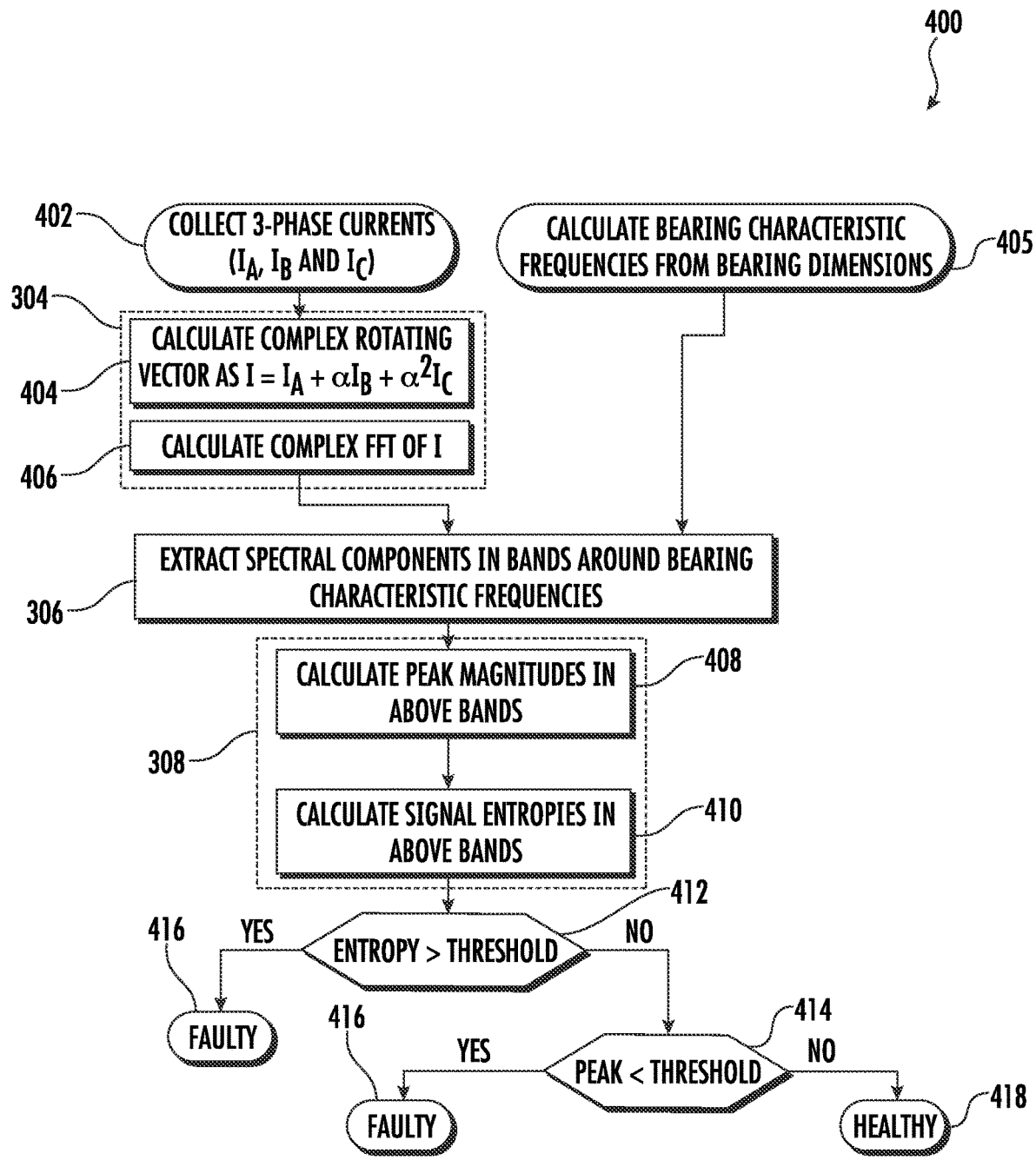
FIG. 7 illustrates a flow diagram of another embodiment of a method for preventing damage in a bearing of a generator due to EDM according to the present disclosure.

As shown at (302), the method 300 includes monitoring, via a controller (such as controller 202), one or more electrical signals of the power conversion assembly 210. For example, in an embodiment, the operating parameter(s) may include current and/or voltage collected from the rotor-side power converter 220 or the line-side converter 222. More specifically, FIG. 7 illustrates a detail method 400 that, as shown at (402), includes collecting three-phase currents and/or three-phase voltages from the rotor-side power converter 220 ($I_A$, $I_B$, and $I_C$).

Referring back to FIG. 6, as shown at (304), the method 300 includes converting, via the controller 202, the electricals signal(s) to a frequency domain. More specifically, as shown at (404) of FIG. 7, the controller 202 is configured to convert the electricals signal(s) to the frequency domain by calculating a complex rotating vector of the one or more electrical signals, e.g., using Equation (1) below:

$$I = I_A + \alpha I_B + \alpha^2 I_C \qquad \text{Equation (1)}$$

where $$\alpha = e^{\frac{j2\pi}{3}}$$

is a complex number indicating a 120-degrees phase shift and $I_A$, $I_B$ and $I_C$ are instantaneous currents in the phases A, B and C respectively. I is the instantaneous current complex number vector.

Further, as shown at (406) of FIG. 7, the controller 202 also calculates a complex fast Fourier transform (FFT) of the complex rotating vector.

Referring to FIGS. 6 and 7, as shown at (306), the method 300 thus includes extracting, via the controller 202, one or more spectral components in frequency bands of the frequency domain around one or more known characteristic frequencies of the bearing 124. Thus, as shown at (405) of FIG. 7, the controller 202 is also configured to calculate the bearing characteristic frequencies for the bearing dimensions and/or size.

Accordingly, as shown at (308) of FIG. 6, the method 300 further includes determining, via the controller 202, at least one characteristic of the spectral component(s) in the frequency bands. More specifically, as shown at (408) of FIG. 7, the controller 202 may calculate one or more peak magnitudes of the spectral component(s) in the frequency bands. Moreover, as shown at (410), the controller may also calculate one or more entropies of the spectral component(s) in the frequency bands.

As shown at (310), the method 300 includes comparing, via the controller 202, the characteristic(s) of the spectral component(s) in the frequency bands to at least one baseline value. More specifically, as shown at (412) and (414) of FIG. 7, in one embodiment, the controller 202 is configured to compare the one or more entropies to an entropy threshold and the one or more peak magnitudes to a magnitude threshold, respectively. In certain embodiments, as an example, the entropy can be calculated using Equation (2) below:

$$S = (\Sigma_{i=1}^{N}(A_i^2/\Sigma_k A_k^2)\log_2(A_i^2/\Sigma_k A_k^2))/\log_2 N \qquad \text{Equation (2)}$$

where $A_i$ is the $i^{th}$ component of the amplitude spectrum.

In alternative embodiments, the controller 202 may be configured to generate a high-dimensional vector including a plurality of characteristics and comparing the high-dimensional vector to a baseline cluster having similar vectors from a baseline generator. In such embodiments, deviations from the baseline cluster provides the health metric of the generator bearing.

Moreover, and referring back to FIG. 6, as shown at (312), the method 300 includes generating, via the controller 202, a fault signal or a baseline signal for the bearing based on the comparison. More particularly, as shown at (416) of FIG. 7, the controller 202 is configured to generate the fault signal when the one or more entropies exceeds the entropy threshold. In contrast, if the one or more entropies is less than the entropy threshold, as shown at (414), the controller 202 is configured to compare the one or more peak magnitudes to the magnitude threshold. Moreover, as shown at (416), the controller 202 is configured to generate the fault signal when the one or more peak magnitudes is less than the magnitude threshold. Further, as shown at (418), the controller 202 is configured to generate the baseline signal when the one or more entropies is less than the entropy threshold and the one or more peak magnitudes is greater than the magnitude threshold.

Figure 8:
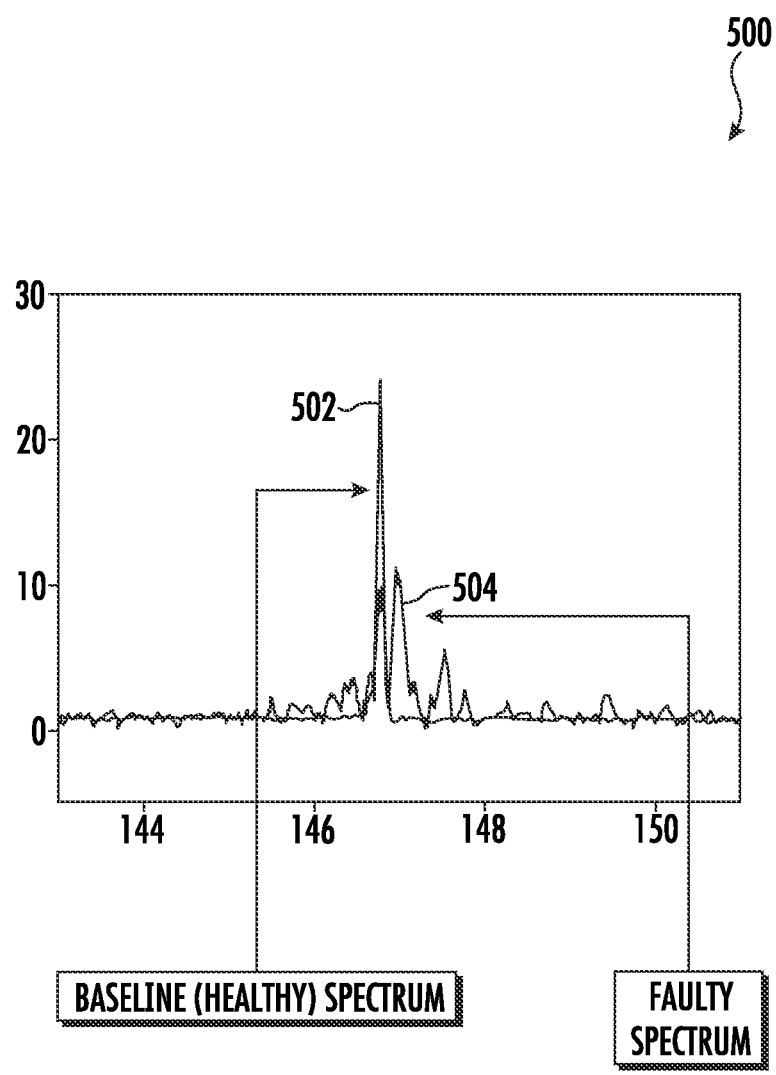
FIG. 8 illustrates a graphical representation of the impact of EDM on the current spectrum in a generator according to the present disclosure.

In such embodiments, increases in the one or more entropies and decreases in the one or more peak magnitudes indicates worsening of EDM damage in the bearing. For example, as shown in FIG. 8, a graphical representation 500 of the impact of EDM on the current spectrum in a generator according to the present disclosure is illustrated. In particular, as shown, the graphical representation 500 depicts a frequency domain of a baseline bearing spectrum 502 and a faulty bearing spectrum 504. Thus, the graphical representation 500 illustrates how the faulty bearing spectrum 504 has increased entropy and a lower peak magnitude than the baseline bearing spectrum 502.

Referring back to FIG. 6, in response to the fault signal being generated, as shown at (314), the method 300 includes implementing, via the controller 202, a control action. For example, in particular embodiments, the control action may include changing an operating set point of the wind turbine 10, shutting down the wind turbine 10, generating an alarm, scheduling a repair, replacing at least one of the bearing insulation 132 or the ground brush 126, and/or any other suitable action.

Figure 9:
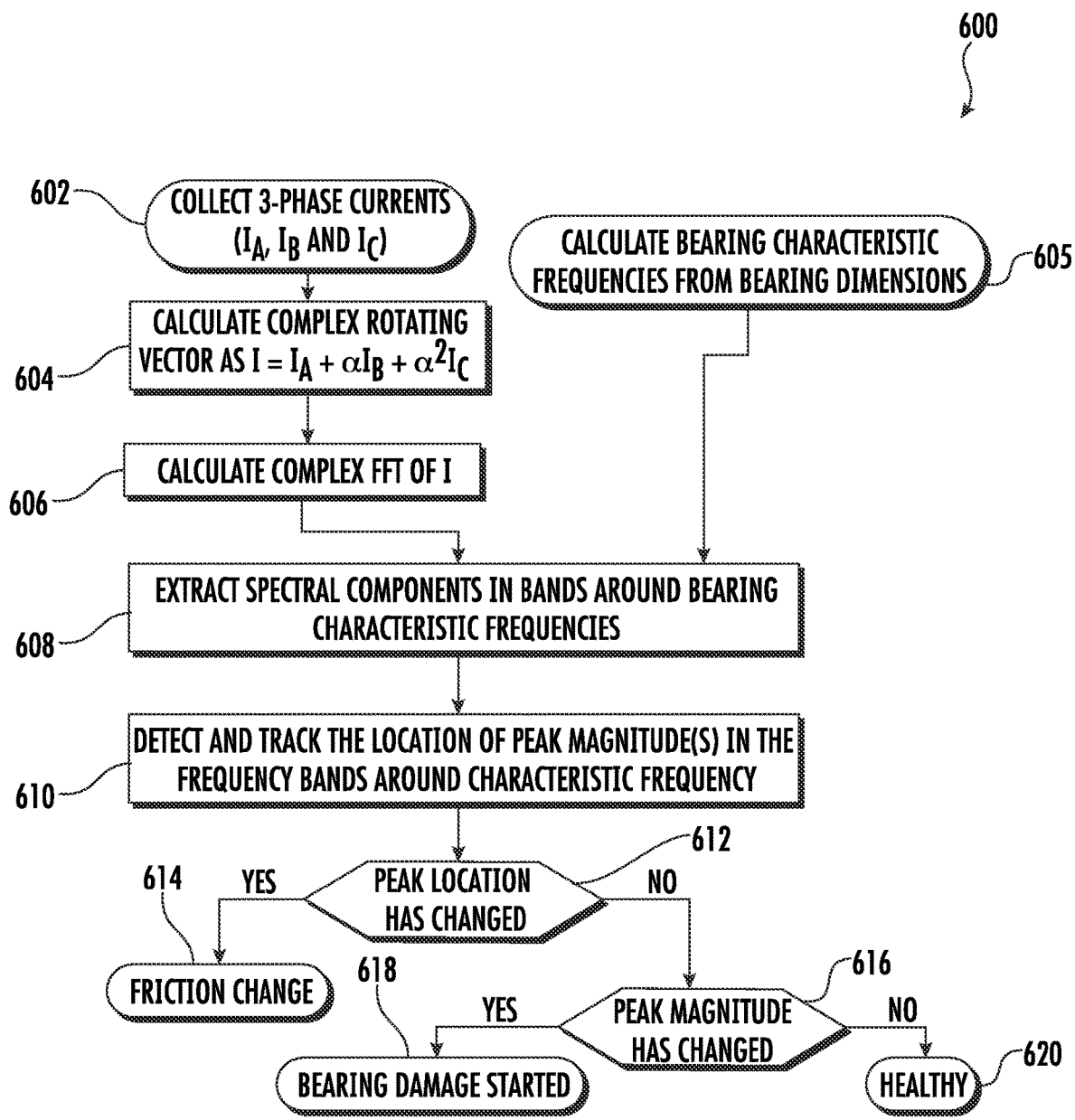
FIG. 9 illustrates a flow diagram of still another embodiment of a method for preventing damage in a bearing of a generator according to the present disclosure.

Referring now to FIG. 9, a flow diagram of another embodiment of a method 600 for preventing damage in a bearing of a generator according to the present disclosure is illustrated. As shown at (602), the method 600 includes collecting three-phase currents and/or three-phase voltages from the rotor-side power converter 220 and/or the line-side converter 222 (e.g., $I_A$, $I_B$, and $I_C$). Moreover, as shown at (604), the method 600 includes calculating a complex rotating vector of the one or more electrical signals, e.g., using Equation (3) below:

$$I = I_A + \alpha I_B + \alpha^2 I_C \quad \text{Equation (3)}$$

where $$\alpha = e^{\frac{j2\pi}{3}}$$

is a complex number indicating a 120-degrees phase shift and $I_A$, $I_B$ and $I_C$ are instantaneous currents in the phases A, B and C respectively. I is the instantaneous current complex number vector. In addition to utilizing the complex rotating vector of current as described above, the present disclosure also encompasses utilizing spectral information from other quantities derived from voltages and current, such as instantaneous real power, reactive power, etc., which can be used for PMGs and/or other types of electrical machines.

Further, as shown at (606), the method 600 includes calculating a complex FFT of the complex rotating vector. Thus, as shown at (605), the controller 202 is also configured to calculate the bearing characteristic frequencies for the bearing dimensions and/or size. As shown at (608), the method 600 includes extracting spectral components in frequency bands around the bearing characteristic frequencies. As shown at (610), the method 600 then monitors the peak magnitudes of the spectral components and tracks the location of the peak magnitudes in the frequency bands around the bearing characteristic frequencies.

Accordingly, as shown at (612), the method 600 includes determining whether the peak location has changed. If so, as shown at (614), the controller 202 is configured to indicate that a friction changed has occurred in the bearing. If not, the method proceeds to (616) and determines whether the peak magnitude has changed. If so, as shown at (618), the controller 202 is configured to indicate that bearing damage has started. If not, as shown at (620), the controller 202 is configured to indicate that the bearing is representative of a baseline generator (e.g., the bearing is healthy and/or able to continue operating as-is).

Figure 10:
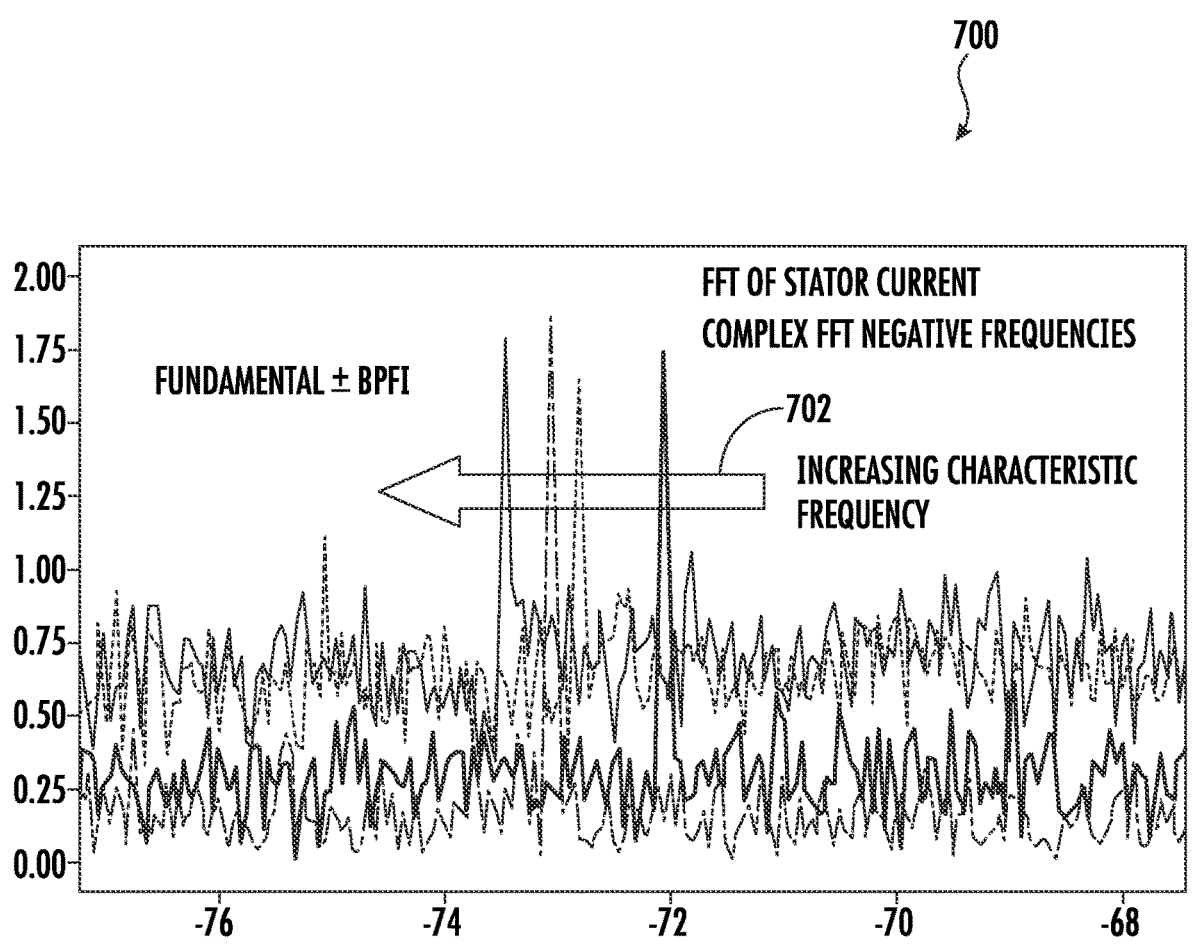
FIG. 10 illustrates a graphical representation of the impact of lubricant degradation on the current spectrum in a generator according to the present disclosure.

Referring now to FIG. 10, a graphical representation 700 of the impact of lubricant degradation on the current spectrum in a generator according to the present disclosure is illustrated. In particular, as shown, the graphical representation 700 depicts a frequency domain of spectral components in frequency bands of the bearing. More specifically, as shown, the graphical representation 700 illustrates arrow 702 that depicts the increase of the characteristic frequency with improving lubricant health.

Figure 11:
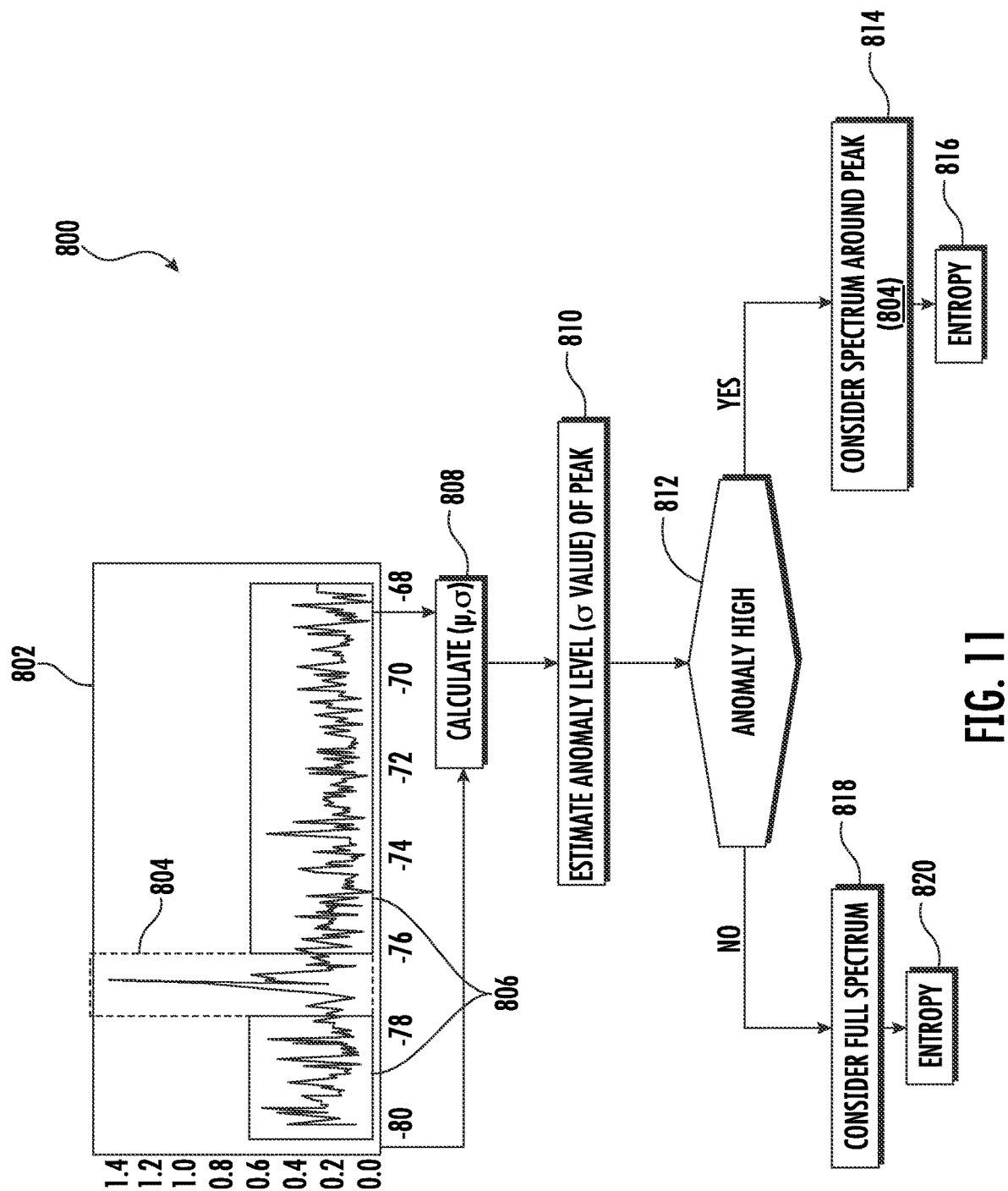
FIG. 11 illustrates a flow diagram of yet another embodiment of a method for preventing damage in a bearing of a generator according to the present disclosure.

FIG. 11 illustrates a flow diagram of yet another embodiment of a method 800 for preventing damage in a bearing of a generator according to the present disclosure. As shown, the plot 802 illustrates baseline 804 and faulty 806 frequency component movement for the same generator speed and compares the entropies of the healthy and faulty components. Thus, as shown at (808), the method 800 calculates the peak magnitude and angle of each of the healthy and faulty components. As shown at (810), the method 800 includes estimating the anomaly level of the peak values. As shown at (812), the method 800 includes determining whether the peak is high enough. If yes, as shown at (814) and (816), the method 800 includes considering the spectrum around the peak and determining the entropy thereof. If no, as shown at (818) and (820), the method 800 includes considering the full spectrum and determining the entropy thereof.

Various aspects and embodiments of the present invention are defined by the following numbered clauses:

Clause 1. A method for preventing damage in a bearing of a generator, the generator being electrically coupled to a power conversion assembly with a first converter coupled to a second converter, the method comprising:

monitoring, via a controller, one or more electrical signals of the power conversion assembly;

converting, via the controller, the one or more electricals signals to a frequency domain;

extracting, via the controller, one or more spectral components in frequency bands of the frequency domain around one or more known characteristic frequencies of the bearing;

determining, via the controller, at least one characteristic of the one or more spectral components in the frequency bands;

comparing, via the controller, the at least one characteristic of the one or more spectral components in the frequency bands to at least one baseline value;

generating, via the controller, a fault signal or a baseline signal for the bearing based on the comparison; and in response to the fault signal being generated, implementing, via the controller, a control action.

Clause 2. The method of any of the preceding clauses, wherein the one or more electrical signals comprises at least one of current or voltage collected from the first converter.

Clause 3. The method of any of the preceding clauses, wherein the generator is part of a wind turbine power system, the first converter is a rotor-side converter of the wind turbine power system, and the second converter is a line-side converter of the wind turbine power system, and wherein the current comprises a three-phase rotor current and the voltage comprises a three-phase rotor voltage of the rotor-side converter or the line-side converter.

Clause 4. The method of any of the preceding clauses, wherein converting the one or more electricals signals to the frequency domain further comprises:
calculating a complex rotating vector of the one or more electrical signals; and
calculating a complex fast Fourier transform (FFT) of the complex rotating vector.

Clause 5. The method of any of the preceding clauses, wherein determining the at least one characteristic of the one or more spectral components in the frequency bands further comprises:

calculating one or more peak magnitudes of the one or more spectral components in the frequency bands; and calculating one or more entropies of the one or more spectral components in the frequency bands.

Clause 6. The method of any of the preceding clauses, wherein comparing the at least one characteristic of the one or more spectral components in the frequency bands to the at least one baseline value further comprises: comparing the one or more entropies to an entropy threshold; and, comparing the one or more peak magnitudes to a magnitude threshold.

Clause 7. The method of any of the preceding clauses, wherein generating the fault signal or the baseline signal based on the comparison further comprises:

generating the fault signal when the one or more entropies exceeds the entropy threshold;

if the one or more entropies is less than the entropy threshold, comparing the one or more peak magnitudes to the magnitude threshold;

generating the fault signal when the one or more peak magnitudes is less than the magnitude threshold; and generating the baseline signal when the one or more entropies is less than the entropy threshold and the one or more peak magnitudes is greater than the magnitude threshold.

Clause 8. The method of any of the preceding clauses, wherein changes in at least one of the one or more entropies or the one or more peak magnitudes indicates worsening of electrical discharge machining (EDM) damage in the bearing.

Clause 9. The method of any of the preceding clauses, wherein determining the at least one characteristic of the one or more spectral components in the frequency bands further comprises:

calculating a location of one or more peak magnitudes of the one or more spectral components in the frequency bands; and monitoring changes in friction using the one or more spectral components in the frequency bands, wherein degrading lubrication causes gradual increases in the friction and changes in the location of the one or more peak magnitudes.

Clause 10. The method of any of the preceding clauses, wherein comparing the at least one characteristic of the one or more spectral components in the frequency bands to the at least one baseline value further comprises:

generating a high-dimensional vector comprising a plurality of characteristics, the plurality of characteristics comprising that least one characteristic; and comparing the high-dimensional vector to a baseline cluster comprising similar vectors from a baseline generator.

Clause 11. The method of any of the preceding clauses, wherein the control action further comprises at least one of changing an operating set point of the generator or the power conversion assembly, shutting down the generator, generating an alarm, scheduling a repair, or replacing at least one component of the generator.

Clause 12. A method for preventing damage in a bearing of a generator of an electrical power system, the electrical power system having a power conversion assembly with a first converter coupled to a second converter, the power conversion assembly electrically coupled to the generator, the method comprising:

monitoring, via a controller, one or more electrical signals of the power conversion assembly of the electrical power system;

calculating, via the controller, a complex rotating vector of the one or more electrical signals;

calculating, via the controller, a complex fast Fourier transform (FFT) of the complex rotating vector;

extracting, via the controller, one or more spectral components in frequency bands around one or more known characteristic frequencies of the bearing;

calculating, via the controller, one or more peak magnitudes in the frequency bands;

calculating, via the controller, one or more entropies in the frequency bands;

comparing, via the controller, the one or more entropies to an entropy threshold;

generating, via the controller, a fault signal for the bearing when the one or more entropies exceeds the entropy threshold;

if the one or more entropies does not exceed the threshold, comparing, via the controller, the one or more peak magnitudes to a magnitude threshold;

generating, via the controller, the fault signal for the bearing when the one or more peak magnitudes is less than the magnitude threshold;

generating, via the controller, a baseline signal for the bearing when the one or more entropies is less than the entropy threshold and the one or more peak magnitudes is greater than the magnitude threshold; and in response to the fault signal being generated, implementing, via the controller, a control action.

Clause 13. A wind turbine power system connected to a power grid, the wind turbine power system comprising:

a doubly-fed induction generator (DFIG) comprising a rotor, a stator, and at least one bearing;

a power conversion assembly electrically coupled to the DFIG, the power conversion assembly comprising a rotor-side converter coupled to a line-side converter;

a controller configured to control the wind turbine power system, the controller configured to perform a plurality of operations, the plurality of operations comprising:

monitoring one or more electrical signals of the power conversion assembly;

converting the one or more electricals signals to a frequency domain;

extracting one or more spectral components in frequency bands of the frequency domain around one or more known characteristic frequencies of the bearing;

determining at least one characteristic of the one or more spectral components in the frequency bands;

comparing the at least one characteristic of the one or more spectral components in the frequency bands to at least one baseline value;

generating a fault signal or a baseline signal for the bearing based on the comparison; and in response to the fault signal being generated, implementing a control action.

Clause 14. The wind turbine power system of clause 13, wherein the one or more electrical signals comprises at least one of current or voltage collected from the rotor-side converter or the line-side converter.

Clause 15. The wind turbine power system of clauses 13-14, wherein converting the one or more electricals signals to the frequency domain further comprises:

calculating a complex rotating vector of the one or more electrical signals; and calculating a complex fast Fourier transform (FFT) of the complex rotating vector.

Clause 16. The wind turbine power system of clauses 13-15, wherein determining the at least one characteristic of the one or more spectral components in the frequency bands further comprises:

calculating one or more peak magnitudes of the one or more spectral components in the frequency bands; and calculating one or more entropies of the one or more spectral components in the frequency bands.

Clause 17. The wind turbine power system of clauses 13-16, wherein comparing the at least one characteristic of the one or more spectral components in the frequency bands to the at least one baseline value further comprises:

comparing the one or more entropies to an entropy threshold; and, comparing the one or more peak magnitudes to a magnitude threshold.

Clause 18. The wind turbine power system of clauses 13-17, wherein generating the fault signal or the baseline signal for the bearing based on the comparison further comprises:
generating the fault signal when the one or more entropies exceeds the entropy threshold;
if the one or more entropies is less than the entropy threshold, comparing the one or more peak magnitudes to the magnitude threshold;
generating the fault signal when the one or more peak magnitudes is less than the magnitude threshold; and
generating the baseline signal when the one or more entropies is less than the entropy threshold and the one or more peak magnitudes is greater than the magnitude threshold.

Clause 19. The wind turbine power system of clauses 13-18, wherein determining the at least one characteristic of the one or more spectral components in the frequency bands further comprises:
calculating a location of one or more peak magnitudes of the one or more spectral components in the frequency bands; and
monitoring changes in friction using the one or more spectral components in the frequency bands,
wherein degrading lubrication causes gradual increases in the friction and changes in the location of the one or more peak magnitudes.

Clause 20. The wind turbine power system of clauses 13-19, wherein comparing the at least one characteristic of the one or more spectral components in the frequency bands to the at least one baseline value further comprises:
generating a high-dimensional vector comprising a plurality of characteristics, the plurality of characteristics comprising that least one characteristic; and
comparing the high-dimensional vector to a baseline cluster comprising similar vectors from a baseline generator.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing damage in a bearing of a generator, the generator being electrically coupled to a power conversion assembly with a first converter coupled to a second converter, the method comprising:
    monitoring, via a controller, one or more electrical signals of the power conversion assembly;
    converting, via the controller, the one or more electricals signals to a frequency domain;
    extracting, via the controller, one or more spectral components in frequency bands of the frequency domain around one or more known characteristic frequencies of the bearing;
    determining, via the controller, one or more peak magnitudes and one or more entropies of the one or more spectral components in the frequency bands;
    comparing, via the controller, one or more entropies of the one or more spectral components in the frequency bands to an entropy threshold;
    generating, via the controller, a fault signal or a baseline signal for the bearing when the one or more entropies exceeds the entropy threshold;
    if the one or more entropies is less than the entropy threshold, comparing the one or more peak magnitudes to a magnitude threshold;
    generating the fault signal when the one or more peak magnitudes is less than the magnitude threshold;
    generating the baseline signal when the one or more entropies is less than the entropy threshold and the one of more peak magnitudes is greater than the magnitude threshold; and
    in response to the fault signal being generated, implementing, via the controller, a control action.

2. The method of claim 1, wherein the one or more electrical signals comprises at least one of current or voltage collected from the first converter.

3. The method of claim 2, wherein the generator is part of a wind turbine power system, the first converter is a rotor-side converter of the wind turbine power system, and the second converter is a line-side converter of the wind turbine power system, and wherein the current comprises a three-phase rotor current and the voltage comprises a three-phase rotor voltage of the rotor-side converter or the line-side converter.

4. The method of claim 1, wherein converting the one or more electricals signals to the frequency domain further comprises:
    calculating a complex rotating vector of the one or more electrical signals; and
    calculating a complex fast Fourier transform (FFT) of the complex rotating vector.

5. The method of claim 1, wherein changes in at least one of the one or more entropies or the one or more peak magnitudes indicates worsening of electrical discharge machining (EDM) damage in the bearing.

6. The method of claim 1, further comprising
    calculating a location of one or more peak magnitudes of the one or more spectral components in the frequency bands; and
    monitoring changes in friction using the one or more spectral components in the frequency bands,
    wherein degrading lubrication causes gradual increases in the friction and changes in the location of the one or more peak magnitudes.

7. The method of claim 1, further comprising:
    generating a high-dimensional vector comprising a plurality of characteristics, the plurality of characteristics comprising that least one characteristic; and
    comparing the high-dimensional vector to a baseline cluster comprising similar vectors from a baseline generator.

8. The method of claim 1, wherein the control action further comprises at least one of changing an operating set point of the generator or the power conversion assembly, shutting down the generator, generating an alarm, scheduling a repair, or replacing at least one component of the generator.

9. A method for preventing damage in a bearing of a generator of an electrical power system, the electrical power system having a power conversion assembly with a first converter coupled to a second converter, the power conversion assembly electrically coupled to the generator, the method comprising:

monitoring, via a controller, one or more electrical signals of the power conversion assembly of the electrical power system;

calculating, via the controller, a complex rotating vector of the one or more electrical signals;

calculating, via the controller, a complex fast Fourier transform (FFT) of the complex rotating vector;

extracting, via the controller, one or more spectral components in frequency bands around one or more known characteristic frequencies of the bearing;

calculating, via the controller, one or more peak magnitudes in the frequency bands;

calculating, via the controller, one or more entropies in the frequency bands;

comparing, via the controller, the one or more entropies to an entropy threshold;

generating, via the controller, a fault signal for the bearing when the one or more entropies exceeds the entropy threshold;

if the one or more entropies does not exceed the threshold, comparing, via the controller, the one or more peak magnitudes to a magnitude threshold;

generating, via the controller, the fault signal for the bearing when the one or more peak magnitudes is less than the magnitude threshold;

generating, via the controller, a baseline signal for the bearing when the one or more entropies is less than the entropy threshold and the one or more peak magnitudes is greater than the magnitude threshold; and in response to the fault signal being generated, implementing, via the controller, a control action.

10. A wind turbine power system connected to a power grid, the wind turbine power system comprising:

a doubly-fed induction generator (DFIG) comprising a rotor, a stator, and at least one bearing;

a power conversion assembly electrically coupled to the DFIG, the power conversion assembly comprising a rotor-side converter coupled to a line-side converter;

a controller configured to control the wind turbine power system, the controller configured to perform a plurality of operations, the plurality of operations comprising:

monitoring one or more electrical signals of the power conversion assembly;

converting the one or more electricals signals to a frequency domain;

extracting one or more spectral components in frequency bands of the frequency domain around one or more known characteristic frequencies of the bearing;

determining one or more peak magnitudes and one or more entropies of the one or more spectral components in the frequency bands;

comparing one or more entropies of the one or more spectral components in the frequency bands to an entropy threshold;

generating a fault signal or a baseline signal for the bearing when the one or more entropies exceeds the entropy threshold;

if the one or more entropies is less than the entropy threshold, comparing the one or more peak magnitudes to a magnitude threshold;

generating the fault signal when the one or more peak magnitudes is less than the magnitude threshold;

generating the baseline signal when the one or more entropies is less than the entropy threshold and the one of more peak magnitudes is greater than the magnitude threshold; and in response to the fault signal being generated, implementing a control action.

11. The wind turbine power system of claim 10, wherein the one or more electrical signals comprises at least one of current or voltage collected from the rotorside converter or the line-side converter.

12. The wind turbine power system of claim 10, wherein converting the one or more electricals signals to the frequency domain further comprises:

calculating a complex rotating vector of the one or more electrical signals; and calculating a complex fast Fourier transform (FFT) of the complex rotating vector.

13. The wind turbine power system of claim 10, further comprising:

calculating a location of one or more peak magnitudes of the one or more spectral components in the frequency bands; and monitoring changes in friction using the one or more spectral components in the frequency bands, wherein degrading lubrication causes gradual increases in the friction and changes in the location of the one or more peak magnitudes.

14. The wind turbine power system of claim 10, further comprising:

generating a high-dimensional vector comprising a plurality of characteristics, the plurality of characteristics comprising that least one characteristic; and comparing the high-dimensional vector to a baseline cluster comprising similar vectors from a baseline generator.

* * * * *